United States Patent
Adachi (10) Patent No.: US 10,327,273 B2
(45) Date of Patent: Jun. 18, 2019

(54) RECEIVING TERMINAL AND TRANSMITTING TERMINAL

(71) Applicant: KYOCERA CORPORATION, Kyoto (JP)

(72) Inventor: Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 170 days.

(21) Appl. No.: 15/501,071

(22) PCT Filed: Aug. 5, 2015

(86) PCT No.: PCT/JP2015/072245
§ 371 (c)(1),
(2) Date: Feb. 1, 2017

(87) PCT Pub. No.: WO2016/021644
PCT Pub. Date: Feb. 11, 2016

(65) Prior Publication Data
US 2017/0231023 A1    Aug. 10, 2017

Related U.S. Application Data

(60) Provisional application No. 62/056,076, filed on Sep. 26, 2014, provisional application No. 62/035,088, filed on Aug. 8, 2014.

(51) Int. Cl.
*H04W 76/14* (2018.01)
*H04W 28/06* (2009.01)
(Continued)

(52) U.S. Cl.
CPC ............ *H04W 76/14* (2018.02); *H04L 1/188* (2013.01); *H04L 1/1848* (2013.01); *H04L 69/04* (2013.01);
(Continued)

(58) Field of Classification Search
CPC combination set(s) only.
See application file for complete search history.

(56) References Cited

U.S. PATENT DOCUMENTS 6,477,150 B1 * 11/2002 Maggenti ............... H04M 3/56
                                                                 370/312
2001/0030963 A1    10/2001 Yoshimura et al.
2017/0181206 A1 *  6/2017 Lee .................... H04W 76/14

FOREIGN PATENT DOCUMENTS

JP    2002-026963 A     1/2002
WO    2013/052136 A1    4/2013

OTHER PUBLICATIONS

Lee et al., Layer 2 Entity Establishment for D2D, U.S. Appl. No. 61/983,458, filed Apr. 2014 (Year: 2014).*

(Continued)

*Primary Examiner* — Warner Wong
*Assistant Examiner* — Justin T Van Roie
(74) *Attorney, Agent, or Firm* — Studebaker & Brackett PC (57) ABSTRACT

A receiving terminal includes: a receiver configured to receive a data unit configured by data and a header, from the transmitting terminal in the D2D communication; and a controller configured to hold the data unit including a compressed header for a predetermined period even if decoding the compressed header is failed when the compressed header is used as the header. In the D2D communication, a timing at which a receiving entity is formed in the receiving terminal differs from a timing at which a transmitting entity is formed in the transmitting terminal.

12 Claims, 8 Drawing Sheets

(51) Int. Cl.
*H04L 29/06* (2006.01)
*H04L 29/14* (2006.01)
*H04L 1/18* (2006.01)
*H04W 56/00* (2009.01)

(52) U.S. Cl.
CPC .............. *H04L 69/22* (2013.01); *H04L 69/40* (2013.01); *H04W 28/06* (2013.01); *H04W 56/0025* (2013.01)

(56) References Cited

OTHER PUBLICATIONS

International Search Report issued in PCT/JP2015/072245; dated Oct. 27, 2015.
Written Opinion issued in PCT/JP2015/072245; dated Oct. 27, 2015.
3rd Generation Partnership Project; Technical Specification Group Radio Access Network; Study on LTE Device to Device Proximity Services; Radio Aspects; 3GPP TR 36.843 V12.0.1; Mar. 2014; pp. 1-50; Release 12; 3GPP Organizational Partners.
Qualcomm Incorporated (Rapporteur); TP for TR 36.843 capturing agreements from RAN2 #85; 3GPP TSG-RAN WG2 #85: R2-141008; Feb. 10-Feb. 14, 2014; pp. 1-7; Prague, Czech Republic.

* cited by examiner

RECEIVING TERMINAL AND TRANSMITTING TERMINAL

TECHNICAL FIELD

The present invention relates to a receiving terminal and a transmitting terminal that perform D2D communication in a mobile communication system supporting a D2D proximity service.

BACKGROUND ART

In 3GPP (3rd Generation Partnership Project) which is a project aiming to standardize a mobile communication system, the introduction of a Device to Device (D2D) proximity service is discussed as a new function in Release 12 and later (see Non Patent Document 1).

In a mobile communication system, as a technology for reducing an overhead in a header included in a PDU (Protocol Data Unit), a header compression technology is discussed. Specifically, a non-compressed header includes a static header in which an invariable value is stored and a dynamic header in which a variable value is stored. On the other hand, a compressed header includes identification information (CID: Context ID) for identifying the static header and a dynamic header. That is, in the header compression technology, when the static header is replaced by the identification information, an overhead of the header is reduced.

In the above-described 3GPP, it is discussed to use the header compression technology also in the above-described D2D proximity service (D2D ProSe). However, in the D2D proximity service, a timing at which a receiving entity (PDCP layer) is formed in the receiving terminal differs from a timing at which a transmitting entity (PDCP layer) is formed in the transmitting terminal. Therefore, when the compressed header is received without receiving the non-compressed header before the receiving entity is formed, the receiving terminal is not capable of decode the compressed header.

PRIOR ART DOCUMENTS

Non Patent Document

[Non Patent Document 1] 3GPP technical report "TR 36.843 V12.0.1" March, 2014

SUMMARY OF INVENTION

A first aspect is summarized as a receiving terminal performing D2D communication with a transmitting terminal in a mobile communication system supporting a D2D proximity service. The receiving terminal includes: a receiver configured to receive a data unit configured by data and a header, from the transmitting terminal in the D2D communication; and a controller configured to hold the data unit including a compressed header for a predetermined period even if decoding the compressed header is failed when the compressed header is used as the header. In the D2D communication, a timing at which a receiving entity is formed in the receiving terminal differs from a timing at which a transmitting entity is formed in the transmitting terminal.

A second aspect is summarized as a receiving terminal performing D2D communication with a transmitting terminal in a mobile communication system supporting a D2D proximity service. The receiving terminal includes: a receiver configured to receive a data unit configured by data and a header, from the transmitting terminal in the D2D communication; and a controller configured to form a receiving entity for receiving the data unit in the D2D communication. The controller is further configured to form, besides the receiving entity, a feedback transmitting entity for transmitting a feedback to the data unit in the D2D communication. In the D2D communication, a timing at which the receiving entity is formed differs from a timing at which the transmitting entity for transmitting the data unit is formed in the transmitting terminal.

A third aspect is summarized as a transmitting terminal performing D2D communication with a receiving terminal in a mobile communication system supporting a D2D proximity service. The transmitting terminal includes: a transmitter configured to transmit a data unit configured by data and a header, to the receiving terminal in the D2D communication; and a controller configured to form a transmitting entity for transmitting the data unit in the D2D communication. The D2D communication includes unicast D2D communication, group cast D2D communication, or broadcast D2D communication. The controller does not use a compressed header as the header in the group cast D2D communication or the broadcast D2D communication, but uses the compressed header as the header in the unicast D2D communication. In the D2D communication, a timing at which the receiving entity for receiving the data unit in the receiving terminal is formed differs from a timing at which the transmitting entity is formed.

DESCRIPTION OF EMBODIMENTS

A D2D proximity service according to an embodiment of the present invention will be described with reference to the drawings, below. It is noted that, in the description of the drawings below, identical or similar symbols are assigned to identical or similar portions.

It will be appreciated that the drawings are schematically shown and the ratio and the like of each dimension are different from the real ones. Accordingly, specific dimensions, etc. should be determined in consideration of the explanation below. Of course, among the drawings, the dimensional relationship and the ratio may be different.

Overview of Embodiment

Firstly, a receiving terminal according to an embodiment performs D2D communication with a transmitting terminal in a mobile communication system supporting a D2D proximity service. The receiving terminal includes: a receiver configured to receive a data unit configured by data and a header, from the transmitting terminal in the D2D communication; and a controller configured to hold the data unit including a compressed header for a predetermined period even if decoding the compressed header is failed when the compressed header is used as the header. In the D2D communication, a timing at which a receiving entity is formed in the receiving terminal differs from a timing at which a transmitting entity is formed in the transmitting terminal.

In such an embodiment, the receiving terminal holds the data unit including the compressed header for a predetermined period even if the receiving terminal fails to decode the compressed header. Therefore, when receiving the data unit including the non-compressed header after failing to decode the compressed header, the receiving terminal is capable of decoding the compressed header by referring to the non-compressed header. As a result, even in a case where a timing of forming the receiving entity differs from a timing of forming the transmitting entity, that is, even in a case where a timing of forming the receiving entity is later than a timing of forming the transmitting entity, erroneous receiving of the data unit including the compressed header is restrained.

Secondly, the receiving terminal according to an embodiment performs D2D communication with the transmitting terminal in a mobile communication system supporting a D2D proximity service. The receiving terminal includes: a receiver configured to receive a data unit configured by data and a header, from the transmitting terminal in the D2D communication; and a controller configured to form a receiving entity for receiving the data unit in the D2D communication. The controller is further configured to form, besides the receiving entity, a feedback transmitting entity for transmitting a feedback to the data unit in the D2D communication. In the D2D communication, a timing at which the receiving entity is formed differs from a timing at which the transmitting entity for transmitting the data unit is formed in the transmitting terminal.

In such an embodiment, the receiving terminal forms, besides the receiving entity for receiving the data unit in the D2D communication, a feedback transmitting entity for transmitting a feedback to the data unit in the D2D communication. Therefore, even in a case where a timing of forming the receiving entity differs from a timing of forming the transmitting entity, that is, even in a case where the transmitting entity does not comprehend a timing of forming the receiving entity, a feedback transmitted from the receiving entity to the transmitting entity allows the transmitting entity to comprehend the presence of a receiving entity at which decoding a compressed header is failed. For example, in response to the feedback to the effect that decoding the compressed header is failed, the transmitting entity is capable of transmitting the data unit including the non-compressed header.

It is noted that in the D2D communication that is under specification in 3GPP, a communication mode (U-Mode) is defined in which there is no feedback from the receiving terminal to the transmitting terminal at least in L2 (a MAC layer, an RLC layer, and a PDCP layer described later). In other words, there is no function of transmitting the feedback from the receiving entity to the transmitting entity. Therefore, it should be noted that it is necessary to form the feedback transmitting entity besides the receiving entity.

Thirdly, the transmitting terminal according to an embodiment performs D2D communication with the receiving terminal in a mobile communication system supporting a D2D proximity service. The transmitting terminal includes: a transmitter configured to transmit a data unit configured by data and a header, to the receiving terminal in the D2D communication; and a controller configured to form a transmitting entity for transmitting the data unit in the D2D communication. The D2D communication includes unicast D2D communication, group cast D2D communication, or broadcast D2D communication. The controller does not use a compressed header as the header in the group cast D2D communication or the broadcast D2D communication, but uses the compressed header as the header in the unicast D2D communication. In the D2D communication, a timing at which the receiving entity for receiving the data unit in the receiving terminal is formed differs from a timing at which the transmitting entity is formed.

In such an embodiment, a transmitting terminal does not use a compressed header as the header in group cast D2D communication or broadcast D2D communication, but uses a compressed header as the header in unicast D2D communication. Therefore, even in a case where the transmitting entity does not comprehend a timing of forming a receiving entity of a user terminal that participates from halfway in group cast D2D communication or broadcast D2D communication, a situation is restrained where failure of decoding the compressed header occurs. On the other hand, it should be noted that in the unicast D2D communication, a timing of forming the receiving entity differs from a timing of forming the transmitting entity, and thus, failure of decoding the compressed header may occur; however, reduction in overhead, which is obtained by the header compression technology, is prioritized over the situation where failure of decoding the compressed header occurs.

It should be noted that in cellular communication between a radio base station and a user terminal, a timing of forming the receiving entity is the same as a timing of forming the transmitting entity, and thus, a case is not assumed where decoding the compressed header is failed. That is, it should be noted that a problem of failing decoding the compressed header is a problem newly occurred when the D2D communication is studied. On the other hand, it should be noted that as a result of extensive studies, the inventors, et al., have resolved the problem of failing to decode the compressed header through the above-described three embodiments.

First Embodiment

A first embodiment will be described by using, as an example, an LTE system based on the 3GPP standards as a mobile communication system, below.

(1) System Configuration

Figure 1:
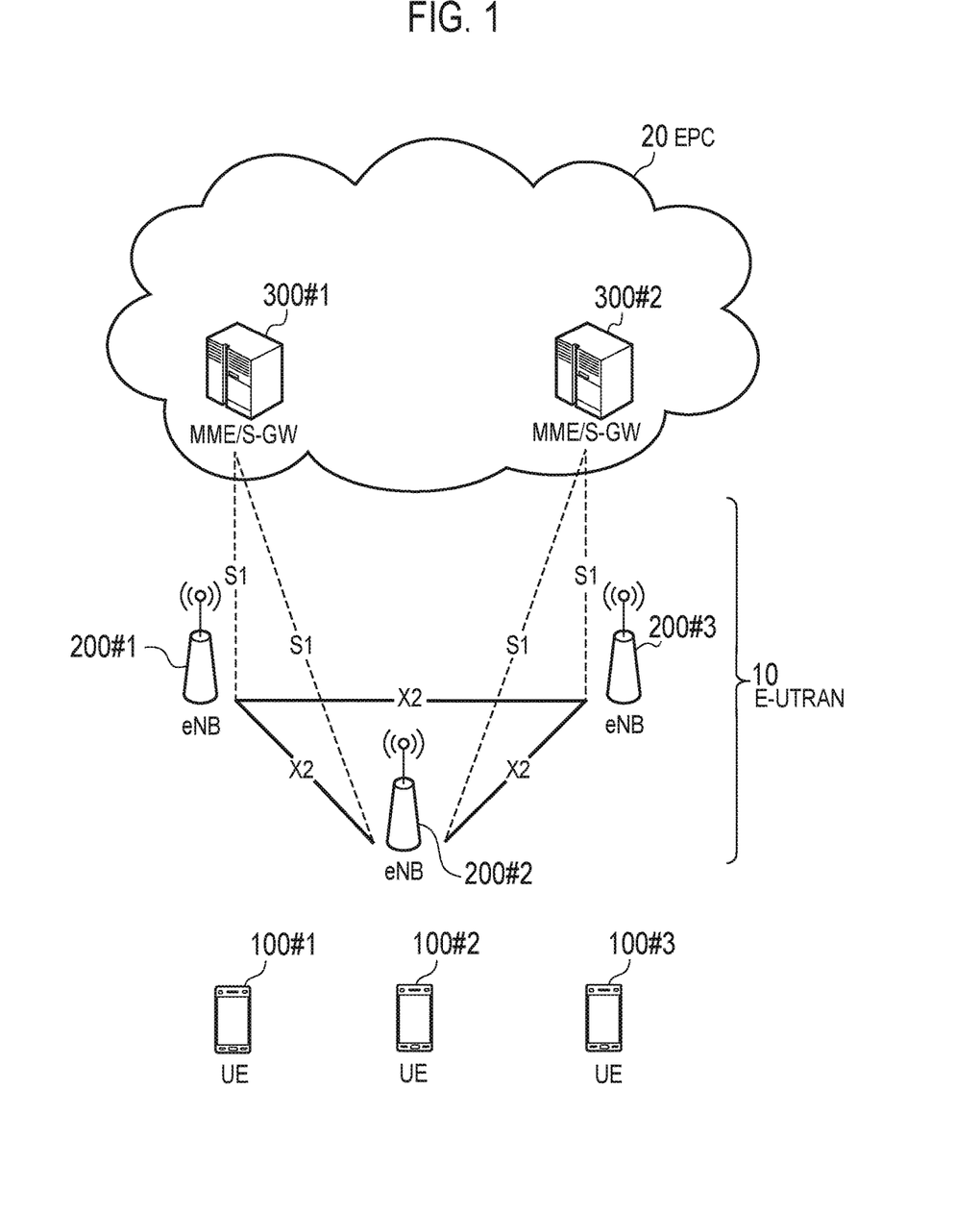
FIG. 1 is a configuration diagram of an LTE system according to a first embodiment.

The system configuration of LTE system according to a first embodiment will be described. FIG. 1 is a configuration diagram of an LTE system according to a first embodiment.

As illustrated in FIG. 1, the LTE system according to the first embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell in a case where the UE 100 is a connected state) formed by the eNB 200. The configuration of the UE 100 will be described later.

The E-UTRAN 10 corresponds to a radio access network. The E-UTRAN 10 includes eNB 200 (an evolved Node-B). The eNB 200 corresponds to a base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resource management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface. It is noted that the E-UTRAN 10 and the EPC 20 constitute a network of the LTE system.

Figure 2:
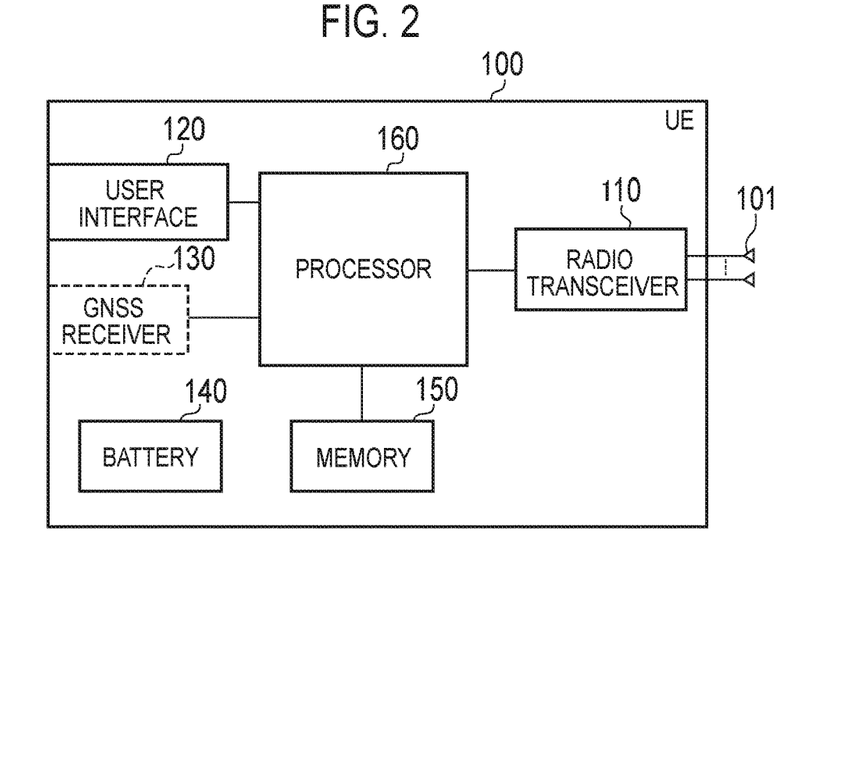
FIG. 2 is a block diagram of a UE 100 according to the first embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 form a controller. The radio transceiver 110 and the processor 160 form a transmitter and a receiver. The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (a reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
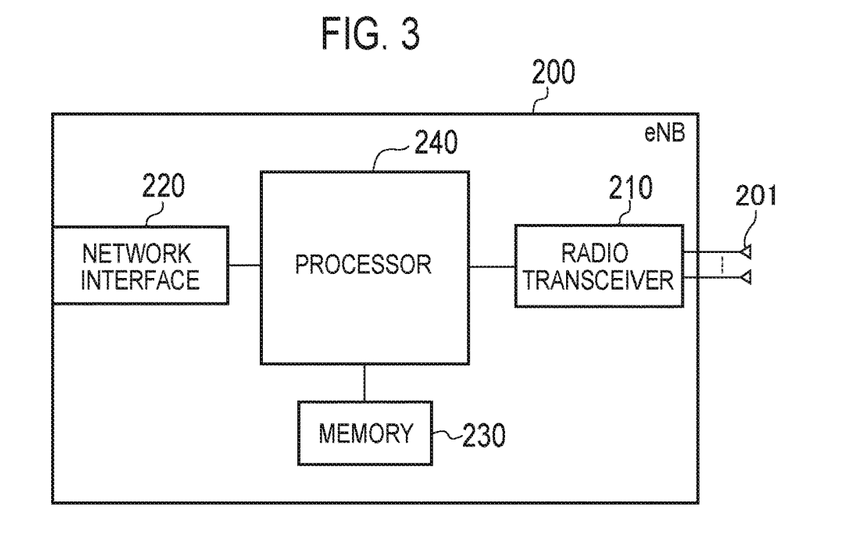
FIG. 3 is a block diagram of an eNB 200 according to the first embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 form a controller. The radio transceiver 210 (and/or the network interface 220) as well as the processor 240 form a transmitter and a receiver. Furthermore, the memory 230 may be integrally formed with the processor 240, and this set (that is, a chipset) may be called a processor.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (a reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
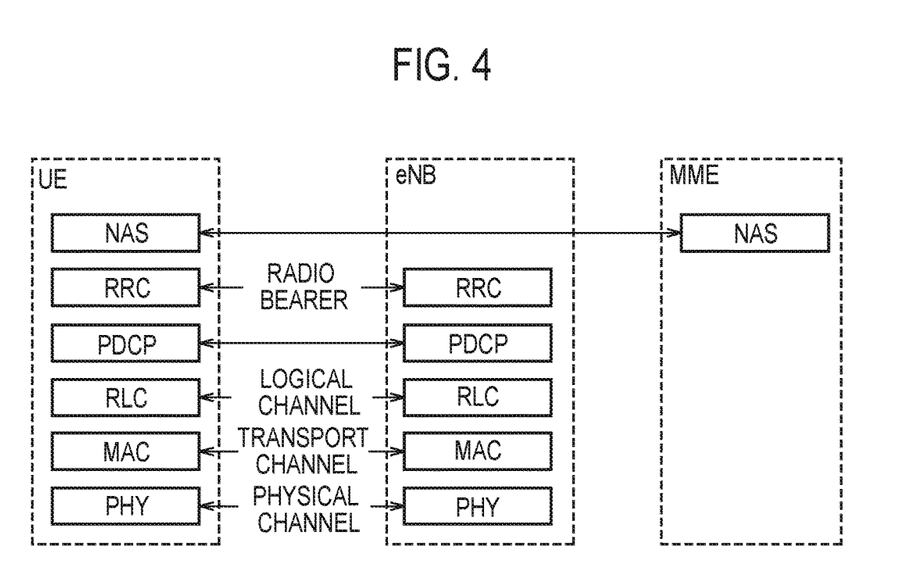
FIG. 4 is a protocol stack diagram of a radio interface according to the first embodiment.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Media Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), a random access procedure, and the like. Between the MAC layer of the UE 100 and the MAC layer of the eNB 200, user data and control signals are transmitted via a transport channel. The MAC layer of the eNB 200 includes a scheduler for determining a transport format (a transport block size and a modulation and coding scheme) of an uplink and a downlink, and a resource block to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption. It should be noted that a transmitting entity for transmitting a data unit (PDCP PDU) in the D2D communication or a receiving entity for receiving a data unit (PDCP PDU) in the D2D communication is formed in the PDCP layer.

The RRC layer is defined only in a control plane that handles control signals. Between the RRC layer of the UE 100 and the RRC layer of the eNB 200, a control signal (an RRC message) for various types of settings is transmitted. The RRC layer controls a logical channel, a transport channel, and a physical channel according to the establishment, re-establishment, and release of a radio bearer. When there is a connection (an RRC connection) between the RRC of the UE 100 and the RRC of the eNB 200, the UE 100 is in an RRC connected state. Otherwise, the UE 100 is in an RRC idle state.

An NAS (Non-Access Stratum) layer positioned above the RRC layer performs session management, mobility management and the like.

Figure 5:
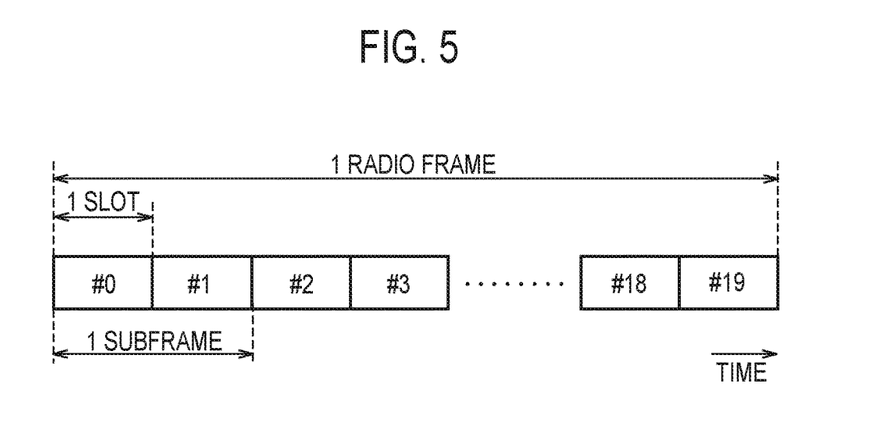
FIG. 5 is a configuration diagram of a radio frame used in an LTE system according to the first embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

(2) D2D Proximity Service

A D2D proximity service will be described, below. The LTE system according to the first embodiment supports the D2D proximity service.

The D2D proximity service is a service enabling direct UE-to-UE communication. The D2D proximity service includes a discovery procedure (Discovery) in which a proximal UE is discovered and a D2D communication (Communication) that is direct UE-to-UE communication. The D2D communication is also referred to as a Direct communication.

A scenario in which all UEs 100 forming a synchronization cluster are located inside a coverage of at least one cell is called "In coverage". A scenario in which all the UEs 100 forming the synchronization cluster are located outside a coverage of at least one cell is called "Out of coverage". A scenario in which some UEs 100, out of a plurality of UEs 100 forming the synchronization cluster, are located inside a coverage of at least one cell and the remaining UEs 100 are located outside a coverage of at least one cell is called "Partial coverage".

In "In coverage", the eNB 200 is a D2D synchronization source. A D2D non-synchronization source, from which a D2D synchronization signal is not transmitted, is synchronized with the D2D synchronization source. The eNB 200 that is a D2D synchronization source notifies a broadcast signal including D2D resource information indicating a radio resource (resource pool) available for the D2D proximity service. The D2D resource information includes information indicating a resource pool for the discovery procedure (Discovery resource information) and information indicating a resource pool for the D2D communication (Communication resource information), for example. The UE 100 that is a D2D non-synchronization source performs a discovery procedure and D2D communication on the basis of the D2D resource information received from the eNB 200.

In "Out of coverage" or "Partial coverage", the UE 100 is a D2D synchronization source. In "Out of coverage", the UE 100 that is a D2D synchronization source transmits D2D resource information indicating a radio resource (resource pool) available for the D2D proximity service. The D2D resource information is included in a D2D synchronization signal, for example. The D2D synchronization signal is a signal transmitted in the synchronization procedure in which a device to device synchronization is established. The D2D synchronization signal includes a D2D SS and a physical D2D synchronization channel (PD2DSCH). The PD2DSCH may be referred to as PSBCH (Physical Sidelink Broadcast Channel). The D2D SS is a signal for providing a synchronization standard of a time and a frequency. The PD2DSCH is a physical channel through which a greater amount of information can be carried than the D2D SS can. The PD2DSCH carries the above-described D2D resource information (the Discovery resource information and the Communication resource information). Alternatively, when the D2D SS is previously associated with the D2D resource information, the transmission of the PD2DSCH may be omitted.

In the first embodiment, the D2D communication includes unicast D2D communication that is one-to-one communication and group cast D2D communication (or broadcast D2D communication) that is one-to-many communication. In the group cast D2D communication, the data unit is transmitted from one transmitting terminal to a group configured by a plurality of receiving terminals. In the broadcast D2D communication, the data unit is transmitted by broadcast from one transmitting terminal.

(3) Operation Environment

Figure 6:
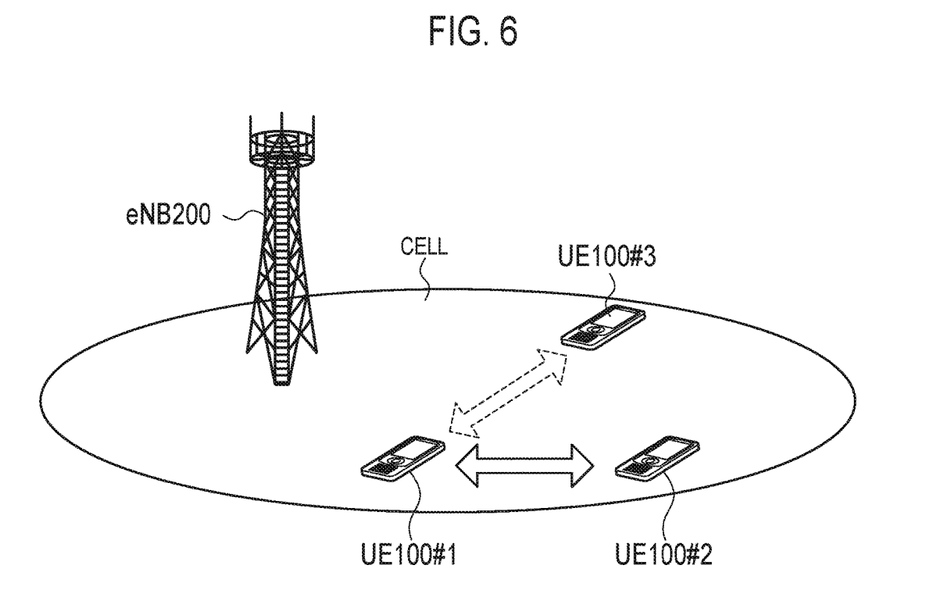
FIG. 6 is a diagram showing an operation environment according to the first embodiment.

An operation environment according to the first embodiment will be described, below. FIG. 6 is a diagram showing an operation environment according to the first embodiment. In FIG. 6, description proceeds with a particular focus on a case where the group cast D2D communication is performed as the D2D communication.

In the first embodiment, a case is assumed where after the group cast D2D communication is started between a UE 100 #1 and a UE 100 #2, a UE 100 #3 participates in the group cast D2D communication. Here, the UE 100 #1 is an example of the transmitting terminal, and the UE 100 #2 and the UE 100 #3 are an example of the receiving terminal.

In such a case, the UE 100 #1 uses a header compression technology (RoHC; Robustness Header Compression) as a technology for reducing an overhead of a header included in the data unit (PDCP PDU). The non-compressed header includes a static header in which an invariable value is stored and a dynamic header in which a variable value is stored. On the other hand, a compressed header includes identification information (CID: Context ID) for identifying the static header and a dynamic header. That is, in the header compression technology, when the static header is replaced by the identification information, an overhead of the header is reduced. Here, it should be noted that the data unit including the non-compressed header is regularly transmitted (refresh).

Figure 7:
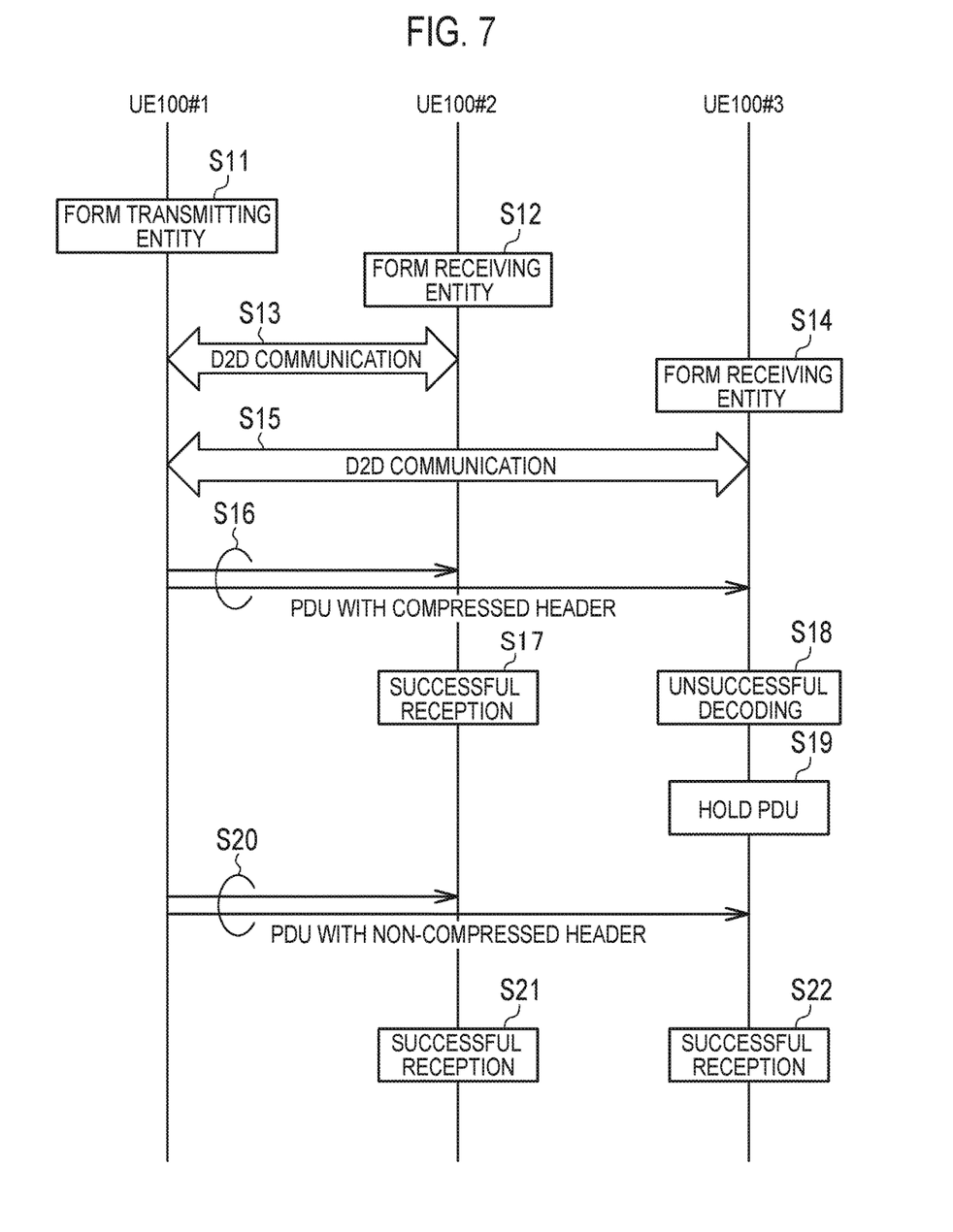
FIG. 7 is a sequence diagram showing an operation according to the first embodiment.

In such an operation environment, operations of the UE 100 #1, the UE 100 #2, and the UE 100 #3 will be described with reference to FIG. 7. FIG. 7 is a sequence diagram showing a communication method according to the first embodiment.

As illustrated in FIG. 7, in step S11, the controller (that is, the memory 150 and the processor 160) of the UE 100 #1 forms a transmitting entity for transmitting the data unit (PDCP PDU) in the PDCP layer.

In step S12, the controller (that is, the memory 150 and the processor 160) of the UE 100#2 forms a receiving entity for receiving the data unit (PDCP PDU) in the PDCP layer. Here, a timing at which the receiving entity is formed in the UE 100 #2 differs from a timing at which the transmitting entity is formed in the UE 100 #1. Further, the transmitting entity of the UE 100 #1 does not comprehend a timing of forming the receiving entity of the UE 100 #2.

In step S13, the D2D communication (here, the group cast D2D communication) is started between the UE 100 #1 and the UE 100 #2.

In step S14, the controller (that is, the memory 150 and the processor 160) of the UE 100#3 forms a receiving entity for receiving the data unit (PDCP PDU) in the PDCP layer. Here, a timing at which the receiving entity is formed in the UE 100 #3 differs from a timing at which the transmitting entity is formed in the UE 100 #1. Further, the transmitting entity of the UE 100 #1 does not comprehend a timing of forming the receiving entity of the UE 100 #3.

In step S15, the UE 100 #3 participates in the D2D communication (here, the group cast D2D communication) performed between the UE 100 #1 and the UE 100 #2.

In step S16, the UE 100 #1 transmits the data unit (PDCP PDU) including the compressed header. Here, a case is assumed where the UE 100#2 receives the data unit (PDCP PDU) including the non-compressed header, before step S16, and the UE 100#3 does not receive the data unit (PDCP PDU) including the non-compressed header, before step S16.

In step S17, the UE 100#2 already receives the non-compressed header, and thus, the UE 100#2 succeeds in decoding the compressed header. That is, the UE 100#2 succeeds in receiving the data unit (PDCP PDU) to be transmitted in step S16.

In step S18, the UE 100#3 does not receive the non-compressed header yet, and thus, the UE 100#3 fails to decode the compressed header.

In step S19, the UE 100#3 holds the data unit (PDCP PDU) to be received in step S16 for a predetermined period. The predetermined period preferably is longer than a reception cycle of the data unit including the non-compressed header as the header. Alternatively, the predetermined period preferably is a period from failing to decode the compressed header to receiving the data unit including the non-compressed header as the header.

In step S20, the UE 100 #1 transmits the data unit (PDCP PDU) including the non-compressed header.

In step S21, the UE 100#2 succeeds in receiving the data unit (PDCP PDU) to be transmitted in step S20.

In step S22, the UE 100#3 succeeds in receiving the data unit (PDCP PDU) to be transmitted in step S20. Further, the UE 100#3 refers to the non-compressed header included in the data unit (PDCP PDU) to be received in step S20 to decode the compressed header included in the data unit (PDCP PDU) to be received in step S16. As a result, the UE 100#3 is capable of decoding the data unit (PDCP PDU) to be transmitted in step S16.

As described above, in the first embodiment, when the compressed header is used as the header, even if the controller (that is, the memory 150 and the processor 160) of the UE 100#3 (that is, the receiving terminal) fails to decode the compressed header, the controller holds the data unit including the compressed header for a predetermined period. The predetermined period preferably is longer than a reception cycle of the data unit including the non-compressed header as the header. Alternatively, the predetermined period preferably is a period from failing to decode the compressed header to receiving the data unit including the non-compressed header as the header.

In FIG. 7, a case is shown as an example where the UE 100#2 (that is, the receiving terminal) already receives the data unit (PDCP PDU) including the non-compressed header, before step S16. However, the embodiment is not limited thereto. The UE 100#2 (that is, the receiving terminal) may not yet receive the data unit (PDCP PDU) including the non-compressed header, before step S16. It should be noted that in such a case, the UE 100#2 (that is, the receiving terminal) holds the data unit including the compressed header for a predetermined period, similarly to the UE 100#3.

In FIG. 7, a case is shown as an example where the group cast D2D communication is performed as the D2D communication. However, the embodiment is not limited thereto. The D2D communication may be broadcast D2D communication and unicast D2D communication. It should be noted that even if the D2D communication is the unicast D2D communication, a timing of forming the receiving entity differs from a timing of forming the transmitting entity, and thus, the receiving entity may fail to decode the compressed header.

Operation and Effect

In the first embodiment, the receiving terminal (for example, the UE 100#3) holds the data unit including the compressed header for a predetermined period even if the receiving terminal fails to decode the compressed header. Therefore, when receiving the data unit including the non-compressed header after failing to decode the compressed header, the receiving terminal is capable of decoding the compressed header by referring to the non-compressed header. As a result, even in a case where a timing of forming the receiving entity differs from a timing of forming the transmitting entity, that is, even in a case where a timing of forming the receiving entity is later than a timing of forming the transmitting entity, erroneous receiving of the data unit including the compressed header is restrained.

First Modification

A first modification of the first embodiment will be described, below. Mainly the differences from the first embodiment are described, below.

Specifically, in the first modification, the reception cycle of the data unit including the non-compressed header as the header in the group cast D2D communication or the broadcast D2D communication is shorter than the reception cycle of the data unit including the non-compressed header as the header in the unicast D2D communication.

Figure 8:
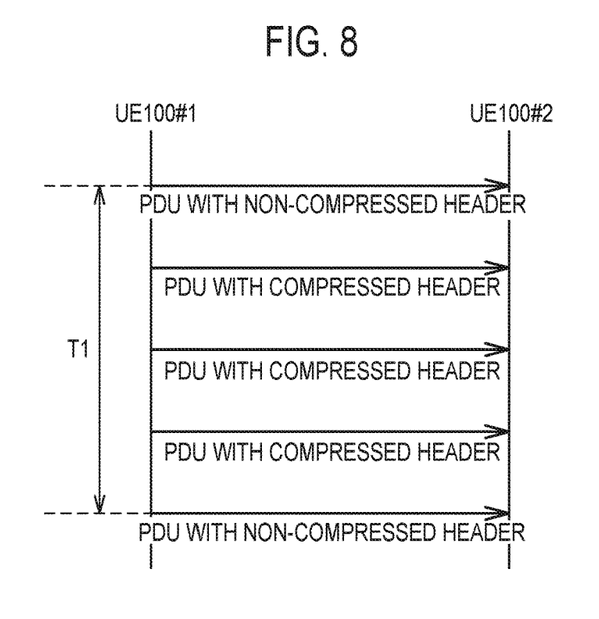
FIG. 8 is a diagram for describing a first modification.
Figure 9:
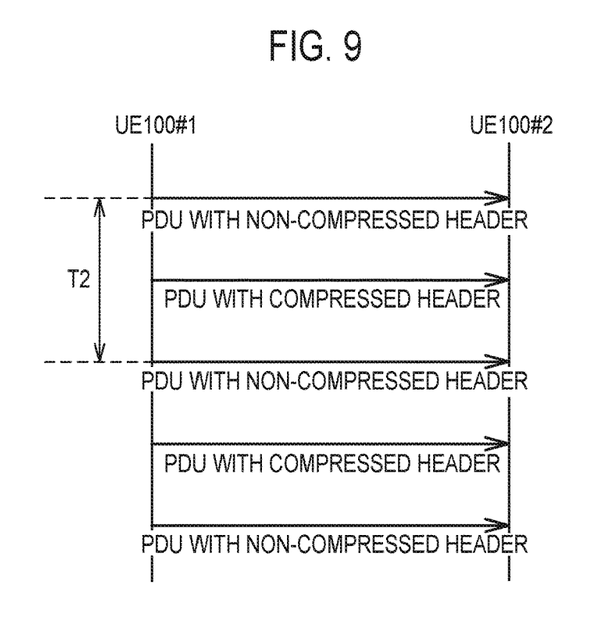
FIG. 9 is a diagram for describing the first modification.

More particularly, as illustrated in FIG. 8, in the unicast D2D communication, the UE 100 #1 (transmitting terminal) transmits to the UE 100 #2 (receiving terminal) a data unit (PDCP PDU) including a non-compressed header in a cycle T1. On the other hand, as illustrated in FIG. 9, in the group cast D2D communication or the group cast D2D communication, the UE 100 #1 (transmitting terminal) transmits to the UE 100 #2 (receiving terminal) the data unit (PDCP PDU) including the non-compressed header in a cycle T2. The cycle T2 is shorter than the cycle T1.

That is, the cycle T2 in which the data unit including the non-compressed header is received in the group cast D2D communication or the broadcast D2D communication is shorter than the cycle T1 in which the data unit including the non-compressed header is received in the unicast D2D communication.

As described above, in the group cast D2D communication or the broadcast D2D communication in which it is not easy to comprehend a timing at which the receiving terminal participates, when the timing at which the receiving terminal receives the non-compressed header is advanced, the timing at which the receiving terminal succeeds in receiving the data unit also is advanced. On the other hand, it should be noted that in the unicast D2D communication in which it is easy to comprehend a timing at which the receiving terminal participates, reduction in overhead, which is obtained by the header compression technology, is prioritized over the situation where failure of decoding the compressed header occurs.

Second Modification

A second modification of the first embodiment will be described, below. Mainly the differences from the first embodiment are described, below.

Specifically, in the first embodiment, the receiving terminal (for example, the UE 100#3) holds the data unit including the compressed header for a predetermined period even if the receiving terminal fails to decode the compressed header. On the other hand, in the second modification, the controller (that is, the memory 150 and the processor 160) of the receiving terminal (for example, the UE 100#3) forms, besides the receiving entity, a feedback transmitting entity for transmitting a feedback to the data unit (PDCP PDU) in the D2D communication. The feedback is information indicating whether decoding the compressed header is successful.

Here, the receiving entity and the transmitting entity formed in the PDCP layer are identified by a transmission source identifier, a transmission target identifier, and a logical channel identifier.

For example, a case is considered where the D2D communication is the unicast D2D communication, the UE 100 #1 is the transmitting terminal, and the UE 100 #3 is the receiving terminal. In such a case, the transmitting entity of the UE 100 #1 is identified by the identifier of the UE 100 #1, and the identifier and the logical channel identifier of the UE 100 #3, within the UE 100 #1. On the other hand, the receiving entity of the UE 100 #3 is identified by the identifier of the UE 100 #3, and the identifier and the logical channel identifier of the UE 100 #1, within the UE 100 #3. The logical channel identifier used in the transmitting entity of the UE 100 #1 may differ from the logical channel identifier used in the transmitting entity of the UE 100 #3.

Next, a case is considered where the D2D communication is the group cast D2D communication (or the broadcast D2D communication), the UE 100 #1 is the transmitting terminal, and the UE 100 #3 is one of the receiving terminals. In such a case, the transmitting entity of the UE 100 #1 is identified by the identifier, the group identifier (broadcast identifier), and the logical channel identifier of the UE 100 #1, within the UE 100 #1. On the other hand, the receiving entity of the UE 100 #3 is identified by the group identifier (broadcast identifier), and the identifier and the logical channel identifier of the UE 100 #1, within the UE 100 #3. The logical channel identifier used in the transmitting entity of the UE 100 #1 may differ from the logical channel identifier used in the transmitting entity of the UE 100 #3.

In the above-described case, the feedback transmitting entity of the UE 100 #3 is identified by the identifier of the UE 100 #3, and the identifier and the logical channel identifier of the UE 100 #1, within the UE 100 #3. The logical channel identifier of the feedback transmitting entity of the UE 100 #3 may differ from the logical channel identifier used in the transmitting entity of the UE 100 #1.

However, when the D2D communication is the group cast D2D communication (or the broadcast D2D communication, the feedback transmitting entity of the UE 100 #3 may be identified by the group identifier (broadcast identifier), and the identifier and the logical channel identifier of the UE 100 #1, within the UE 100 #3. That is, the feedback transmitting entity of the UE 100#3 may use, as the transmission source identifier included in the feedback, the group identifier (or the broadcast identifier) rather than the identifier of its own terminal. As a result of a group identifier (broadcast identifier) not used in the data unit (PDCP PDU) being detected, the transmitting entity of the UE 100 #1 is capable of recognizing that a signal received from the UE 100 #3 is the feedback.

Figure 10:
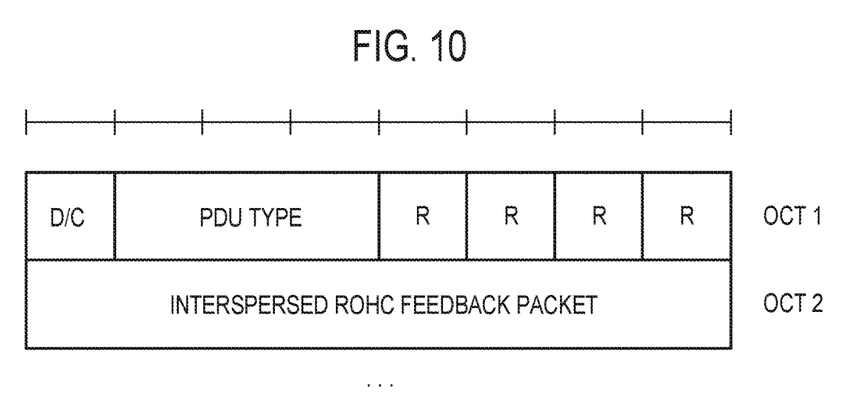
FIG. 10 is a diagram for describing a second modification.

Further, a format of the feedback preferably differs from a format of the data unit (PDCP PDU). The transmitting entity of the UE 100 #1 is capable of recognizing that the signal received from the UE 100 #3 is the feedback by format. For example, a format of the feedback is a format in which data is not included, as illustrated in FIG. 10. As illustrated in FIG. 10, a format of the feedback used in the header compression technology of the D2D communication may be similar to a format of the feedback used in a header compression technology of cellular communication between a radio base station and a user terminal (for example, O-Mode (Bi-directional Optimistic Mode) or R-Mode (Bi-directional Reliable Mode)).

In the second modification, the controller (that is, the memory 150 and the processor 160) of the receiving terminal (for example, the UE 100 #3) preferably form the feedback transmitting entity when failing to decode the compressed header. The feedback transmitting entity preferably transmits the feedback when failing to decode the compressed header. That is, the feedback transmitting entity transmits, as the feedback, only information indicating that decoding the compressed header is failed without transmitting, as the feedback, information indicating that decoding the compressed header is successful.

In the second modification, the feedback transmitting entity preferably transmits the feedback within a predetermined number of times. In other words, the upper limit of the number of times of the feedback transmissions is previously determined. For example, the feedback transmitting entity preferably transmits the feedback only when decoding the compressed header is initially failed.

In the second modification, even if the D2D communication is continued, the controller (that is, the memory 150 and the processor 160) of the receiving terminal (for example, the UE 100 #3) preferably deletes the feedback transmitting entity once the feedback is transmitted. It is noted that when the upper limit of the number of times of the feedback transmissions is previously determined, the controller preferably deletes the feedback transmitting entity when the number of times of feedback transmissions reaches the upper limit. It is noted that even if the D2D communication is continued, the transmitting terminal (UE 100 #1) preferably deletes the feedback receiving entity for receiving the feedback, upon receipt of the feedback. It is noted that when the upper limit of the number of times of the feedback transmissions is previously determined, the transmitting terminal (UE 100 #1) preferably deletes the feedback receiving entity when the number of times of feedback receptions reaches the upper limit.

Figure 11:
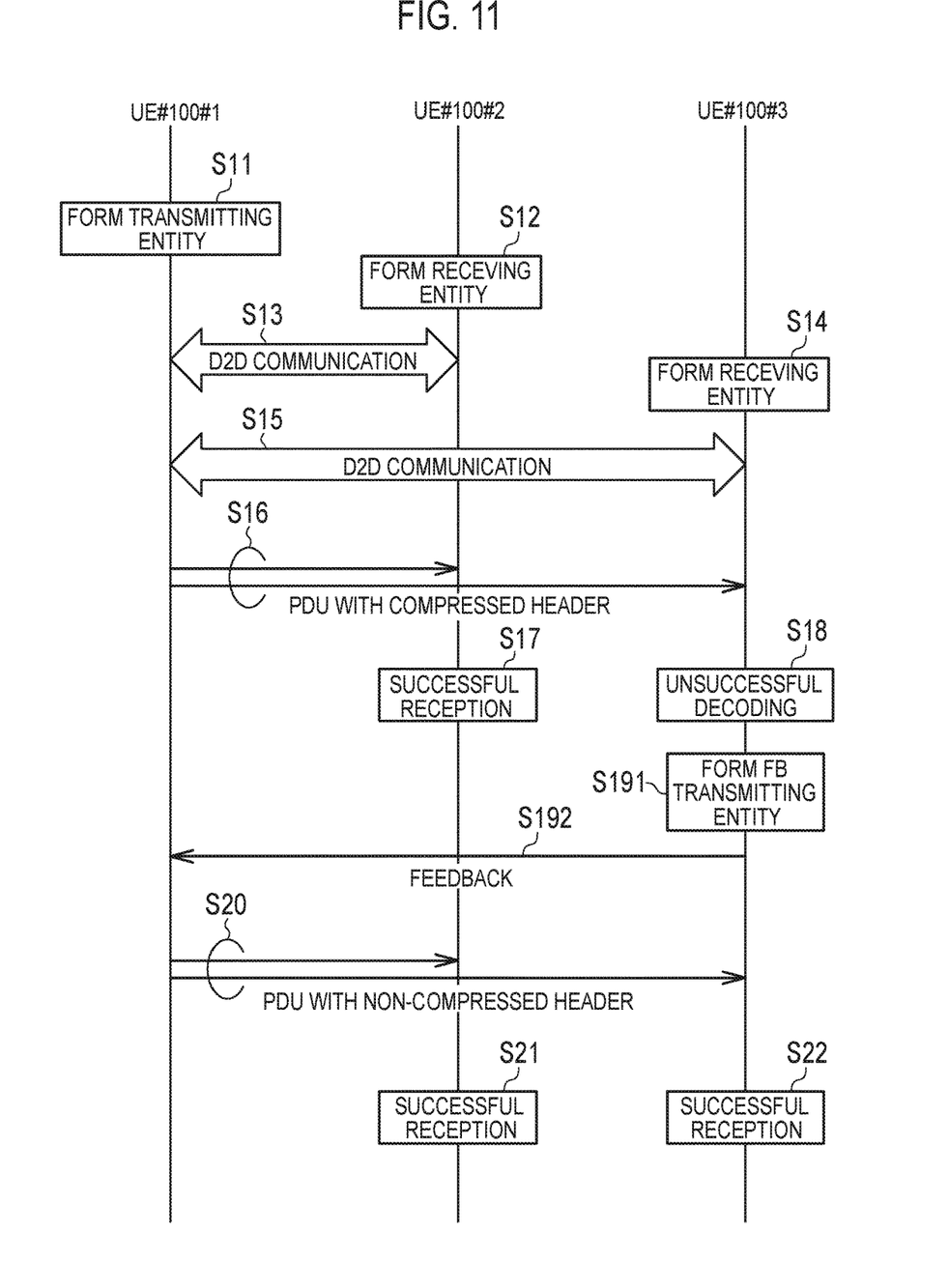
FIG. 11 is a diagram for describing the second modification.

In an operation environment illustrated in FIG. 6, operations of the UE 100 #1, the UE 100 #2, and the UE 100 #3 will be described with reference to FIG. 11, below. FIG. 11 is a sequence diagram showing a communication method according to the second modification. It is noted that in FIG. 11, the same reference numerals are used to designate the processes similar to those in FIG. 7. Therefore, the processes similar to those in FIG. 7 will not be described.

As illustrated in FIG. 11, in step S191, the UE 100 #3 forms, besides the receiving entity, a feedback transmitting entity for transmitting a feedback to the data unit (PDCP PDU) in the D2D communication.

In step S192, the UE 100 #3 transmits, to the UE 100 #1, a feedback indicating that decoding the compressed header is failed.

It is noted that, in step S20, the UE 100 #1 preferably transmits the data unit (PDCP PDU) including the non-compressed header, in response to reception of the feedback.

Here, although omitted in FIG. 11, needless to say, the UE 100 #3 may hold the data unit (PDCP PDU) to be received in step S16 for a predetermined period, in much the same way as in step S19 illustrated in FIG. 7.

Operation and Effect

In the second modification, the receiving terminal (for example, the UE 100 #3) forms, besides the receiving entity for receiving the data unit in the D2D communication, a feedback transmitting entity for transmitting a feedback to the data unit in the D2D communication. Therefore, even in a case where a timing of forming the receiving entity differs from a timing of forming the transmitting entity, that is, even in a case where the transmitting entity does not comprehend a timing of forming the receiving entity, a feedback transmitted from the receiving entity to the transmitting entity allows the transmitting entity to comprehend the presence of a receiving entity at which decoding a compressed header is failed. For example, in response to the feedback to the effect that decoding the compressed header is failed, the transmitting entity is capable of transmitting the data unit including the non-compressed header.

It is noted that in the D2D communication that is under specification in 3GPP, a communication mode (U-Mode) is defined in which there is no feedback from the receiving terminal to the transmitting terminal at least in L2 (a MAC layer, an RLC layer, and a PDCP layer described later). In other words, there is no function of transmitting the feedback from the receiving entity to the transmitting entity. Therefore, it should be noted that it is necessary to form the feedback transmitting entity besides the receiving entity.

Third Modification

A third modification of the first embodiment will be described, below. Description proceeds with a particular focus on a difference from the second modification, below.

In the third modification, as a resource used in the D2D communication, a first resource assigned by the eNB 200 and a second resource available without a need of being assigned by the eNB 200 are defined. The feedback transmitting entity of the receiving terminal (for example, the UE 100 #3) transmits a feedback by using the second resource even if the first resource is used in the D2D communication.

It is noted that the first resource is a radio resource (resource pool) used in D2D communication in "In coverage", for example. On the other hand, the second resource is a radio resource (resource pool) used in the D2D communication in "Out of coverage" or "Partial coverage". For example, the first resource and the second resource may be notified from the eNB 200. Alternatively, the first resource and the second resource may be previously defined. Alternatively, the first resource may be notified from the eNB 200, and the second resource may be previously define.

In the third modification, the feedback is transmitted by using the second resource that does not require assignment by the eNB 200, and thus, it is possible to quickly transmit the feedback from the receiving terminal to the transmitting terminal.

Fourth Modification

A fourth modification of the first embodiment will be described, below. Mainly the differences from the first embodiment are described, below.

Specifically, in the first embodiment, the receiving terminal (for example, the UE 100#3) holds the data unit including the compressed header for a predetermined period even if the receiving terminal fails to decode the compressed header. On the other hand, in the fourth modification, the controller (that is, the memory 150 and the processor 160) of the transmitting terminal (for example, the UE 100 #1) does not use the compressed header as the header in the group cast D2D communication or the broadcast D2D communication, but uses the compressed header as the header in the unicast D2D communication.

It is noted that in the unicast D2D communication using the compressed header, the receiving terminal (for example, the UE 100 #3) may perform in much the same way as in the first embodiment, and the first modification to the third modification.

Operation and Effect

In the fourth modification, the transmitting terminal (for example, the UE 100 #1) does not use the compressed header as the header in the group cast D2D communication or the broadcast D2D communication, but uses the compressed header as the header in the unicast D2D communication. Therefore, even in a case where the transmitting entity does not comprehend a timing of forming a receiving entity of a user terminal that participates from halfway in group cast D2D communication or broadcast D2D communication, a situation is restrained where failure of decoding the compressed header occurs. On the other hand, it should be noted that in the unicast D2D communication, a timing of forming the receiving entity differs from a timing of forming the transmitting entity, and thus, failure of decoding the compressed header may occur; however, reduction in overhead, which is obtained by the header compression technology, is prioritized over the situation where failure of decoding the compressed header occurs.

Other Embodiments

The present invention is explained through the above-described embodiments, but it must not be understood that this invention is limited by the statements and the drawings constituting a part of this disclosure. From this disclosure, various alternative embodiments, examples, and operational technologies will become apparent to those skilled in the art.

Particularly not mentioned in the embodiments, a program may be provided for causing a computer to execute each process performed by the UE 100 and the eNB 200. Furthermore, the program may be recorded on a computer-readable medium. By using the computer-readable medium, it is possible to install the program in a computer. Here, the computer-readable medium recording the program thereon may include a non-transitory recording medium. The non-transitory recording medium is not particularly limited. For example, the non-transitory recording medium may include a recording medium such as a CD-ROM or a DVD-ROM.

Alternatively, a chip may be provided which is configured by: a memory in which a program for performing each process performed by the UE 100 and the eNB 200 is stored; and a processor for executing the program stored in the memory.

In the embodiments, an LTE system is described as an example of a mobile communication system. However, the embodiment is not limited thereto. The mobile communication system may be a system other than the LTE system.

APPENDIX

Supplementary notes according to the aforementioned embodiments will be described below.

HARQ Aspects

It was agreed that RLC/PDCP entity is identified per combination of source ID, destination ID and LCID.

There is one PDCP entity per RLC entity. Source Layer 2 ID, Destination Layer 2 ID and LCID are used for identification of PDCP entity and RLC entity. RLC parameters needed for ProSe Direct Communication are sn-FieldLength and T-reordering, if there is no in-order delivery from lower layer.

However, regarding the number of HARQ entities and number of HARQ processes, some solutions were proposed but there was no agreement so far.

Currently, for the cellular communication, there is one HARQ entity per serving cell. However, for D2D Communication, there is no way to identify the transmitting D2D UE in the SA, Data and DMRS. Therefore, receiving D2D UE can't maintain the HARQ entity per source ID (Source Layer2 ID). So for D2D Communication, the following alternatives may be considered for managing HARQ entity based on the received destination ID (Source Layer2 ID).

ALT.1: only one HARQ entity for D2D Communication
ALT.2: one HARQ entity per type of destination ID, i.e. unicast, broadcast or groupcast
ALT.3: one HARQ entity per destination ID For current cellular communication, the responsibility of HARQ entity is to judge HARQ ACK/NACK, to judge broadcast or unicast, and to manage HARQ retransmission. However, for D2D Communication, there is no HARQ ACK/NACK feedback and same MAC processing is adopted to broadcast, groupcast or unicast data, so only one HARQ entity will be enough. (ALT.1)

With regards to the number of HARQ processes, for cellular communication, the management of retransmission data and combining of retransmission data are performed per HARQ process. For D2D Communication, it is agreed that one SA can assign resources for four retransmission data with the same data but with different RV. Therefore, HARQ process should be established per received SA.

Observation 1: One HARQ entity is supported for D2D Communication, and number of HARQ processes should be same number as the number of received SAs.

RoHC Function

The following PDCP aspects are agreed.
As baseline we assume that from L2 point of view, 1:M D2D communication is one-way and there is no feedback on L2 (MAC/RLC/PDCP).
D2D communication data should be handled as the normal user-plane data, i.e. IP packet.
Header-compression/decompression in PDCP is applicable for D2D communication. U-Mode is used for header compression in PDCP for D2D broadcast operation for public safety.
Security support will be addressed based on input by SA3.
There is one PDCP entity per RLC entity. Source Layer 2 ID, Destination Layer 2 ID and LCID are used for identification of PDCP entity and RLC entity. RLC parameters needed for ProSe Direct Communication are sn-FieldLength and T-reordering, if there is no in-order delivery from lower layer.
PDCP and RLC entities are established/released together.
Tx PDCP/RLC establishment: Leave it up to UE implementation.
Rx PDCP/RLC establishment: Reception of first UMD PDU from a Source Layer 2 ID and Destination Layer 2 ID pair for an LCID, and there is not yet a corresponding receiving RLC entity.
Rx PDCP/RLC release: Leave it up to UE implementation.
PDCP parameters needed for ProSe Direct Communication are discardTimer, maxCID, pdcp-SN-Size and profiles.

As Described above, a lot of PDCP aspects were already agreed, but we still have one concern with regard to RoHC functionality. The concern is that some D2D UEs may participate in an ongoing D2D communication, so these UEs would not be able to interpret what CID indicates and how to de-compress PDCP PDU.

RAN2 already agreed that "there is no feedback on L2" and "U-Mode is used for header compression in PDCP for D2D broadcast operation for public safety". U-mode addresses the failure to interpret compressed header by using periodic transmission of un-compressed header, but periodicity is UE implementation. Therefore, for D2D Communication, the transmitting UE wouldn't know when the receiving UE starts to monitor the D2D communication, so if periodicity is set too long it may take too long for the header to refresh, and the UEs may not be able to receive the data until the header is refreshed. Although periodic transmissions of un-compressed header is based on UE implementation, the use of excessively long periodicity to refresh should not be used for D2D Communication.

Observation 1: Excessively long periodicity before refresh header should not be used for D2D Communication.

However, since the periodicity is determined by UE implementation, RAN may not be able to prevent the issue addressed above using only RoHC U-Mode. So we may need to re-consider whether the feedback indicating the failure to interpret compressed header, e.g. PDCP Control PDU format for interspersed ROHC feedback packet, is necessary or not.

Proposal 1: RAN2 may need to re-consider whether the introduction of feedback for above RoHC issue is necessary or not.

Release Timing of PDCP and RLC Entities

The establishment timing of transmitting and receiving entities and the release timing of receiving entities were agreed. However, the release timing of transmitting entities is not agreed yet. The following two options were previously proposed.

Tx PDCP/RLC Release

Option 1: In-activity timer expiry
Option 2: Release indication from upper layer
Based on the current agreement, the release timing of receiving entities depends on UE implementation, so both options may have an impact on the release timing between the transmitting entity and the receiving entity for D2D Communication. If RLC re-ordering window is introduced and the window size is non-zero, the difference of release timing causes rapid variation of SN value of UMD PDU and then unnecessary discarding may occur. In this case, the transmitting entity should be released after in-activity timer expiry to prevent the occurrence of UMD PDU discarding and the receiving entity should also share the same in-activity timer with the corresponding transmitting entity and use it as the time reference to prevent the occurrence of UMD PDU discarding at the receiving entity.

On the other hand, if RLC re-ordering window is not introduced or window size is zero, the issue described above wouldn't occur, and either Option 1 or Option 2 may be applied by the UE without incurring any unnecessary UMD PDU discarding.

Proposal 2: If UM re-ordering window is non-zero, Tx RLC entity should be released after in-activity timer expiry to prevent the occurrence of UMD PDU discarding.

Proposal 3: If proposal 3 is adopted, the Rx RLC entity should also share the same in-activity timer with the corresponding Tx RLC entity and use it as the reference to prevent the occurrence of UMD PDU discarding.

Proposal 4: If UM re-ordering window size is "zero", either Option 1, Option2 may be applied by the UE without incurring any unnecessary UMD PDU discarding.

CROSS REFERENCE

The entire contents of U.S. Provisional Application No. 62/035,088 (filed on Aug. 8, 2014) and U.S. Provisional Application No. 62/056,076 (filed on Sep. 26, 2014) are incorporated herein by reference.

INDUSTRIAL APPLICABILITY

The present invention is useful in mobile communications field.

The invention claimed is:

1. A receiving terminal configured to perform D2D communication with a transmitting terminal in a mobile communication system supporting a D2D proximity service, comprising:
a receiver configured to receive a first data unit and a second data unit from the transmitting terminal in the D2D communication, the first data unit including data and a compressed header, the second data unit including data and a non-compressed header; and
a controller configured to hold the first data unit including the compressed header for a predetermined period even if decoding the compressed header is failed, wherein
in the D2D communication, a timing at which a receiving entity is formed in the receiving terminal differs from a timing at which a transmitting entity is formed in the transmitting terminal,
the D2D communication includes unicast D2D communication and non-unicast D2D communication, the non-unicast D2D communication including at least one of group cast D2D communication and broadcast D2D communication, and
when the non-unicast D2D communication includes the second data unit including the non-compressed header, a reception cycle of the second data unit including the non-compressed header is shorter than a reception cycle of the second data unit including the non-compressed header when the unicast D2D communication includes the second data unit including the non-compressed header.

2. The receiving terminal according to claim 1, wherein the predetermined period is longer than the reception cycle of the second data unit including the non-compressed header.

3. The receiving terminal according to claim 1, wherein the predetermined period is a period from failing to decode the compressed header to receiving the second data unit including the non-compressed header.

4. A receiving terminal configured to perform D2D communication with a transmitting terminal in a mobile communication system supporting a D2D proximity service, comprising:
a receiver configured to receive a first data unit and a second data unit from the transmitting terminal in the D2D communication, the first data unit including data and a compressed header, the second data unit including data and a non-compressed header; and
a controller configured to form a receiving entity for receiving the first data unit and the second data unit in the D2D communication, wherein
the controller is further configured to form, besides the receiving entity, a feedback transmitting entity for transmitting a feedback to the first data unit and the second data unit in the D2D communication,
in the D2D communication, a timing at which the receiving entity is formed differs from a timing at which a transmitting entity for transmitting the first data unit and the second data unit is formed in the transmitting terminal,
the D2D communication includes unicast D2D communication and non-unicast D2D communication, the non-unicast D2D communication including at least one of group cast D2D communication and broadcast D2D communication, and
when the non-unicast D2D communication includes the second data unit including the non-compressed header, a reception cycle of the second data unit including the non-compressed header is shorter than a reception cycle of the second data unit including the non-compressed header when the unicast D2D communication includes the second data unit including the non-compressed header.

5. The receiving terminal according to claim 4, wherein the transmitting entity formed in the transmitting terminal is configured to use, as a transmission target identifier included in the second data unit, a group identifier or a broadcast identifier, and the feedback transmitting entity formed in the receiving terminal is configured to use, as a transmission source identifier included in the feedback, the group identifier or the broadcast identifier rather than the identifier of the receiving terminal.

6. The receiving terminal according to claim 4, wherein a format of the feedback differs from a format of the second data unit.

7. The receiving terminal according to claim 4, wherein as a resource used in the D2D communication, a first resource assigned by a radio base station and a second resource available without being assigned by the radio base station are defined, and
    the feedback transmitting entity formed in the receiving terminal is configured to transmit the feedback by using the second resource even if the first resource is used in the D2D communication.

8. The receiving terminal according to claim 4, wherein the controller is configured to form the feedback transmitting entity when failing to decode the compressed header.

9. The receiving terminal according to claim 4, wherein the feedback transmitting entity is configured to transmit the feedback when failing to decode the compressed header.

10. The receiving terminal according to claim 4, wherein the feedback transmitting entity is configured to transmit the feedback within a predetermined number of times.

11. The receiving terminal according to claim 4, wherein the controller is further configured to delete the feedback transmitting entity when the feedback is transmitted even if the D2D communication is continued.

12. A transmitting terminal configured to perform D2D communication with a receiving terminal in a mobile communication system supporting a D2D proximity service, comprising:

a transmitter configured to transmit a first data unit and a second data unit to the receiving terminal in the D2D communication, the first data unit including data and a compressed header, and the second data unit including data and a non-compressed header; and a controller configured to form a transmitting entity for transmitting the first data unit and the second data unit in the D2D communication, wherein the D2D communication includes unicast D2D communication and non-unicast D2D communication, the non-unicast D2D communication including at least one of group cast D2D communication and broadcast D2D communication, the controller does not use the first data unit including the compressed header in the non-unicast D2D communication, but uses the first data unit including the compressed header in the unicast D2D communication, in the D2D communication, a timing at which a receiving entity for receiving the data unit is formed in the receiving terminal differs from a timing at which the transmitting entity is formed, and when the non-unicast D2D communication includes the second data unit including the non-compressed header, a transmission cycle of the second data unit including the non-compressed header is shorter than a transmission cycle of the second data unit including the non-compressed header when the unicast D2D communication includes the second data unit including the non-compressed header.

* * * * *